(12) United States Patent
Nakayama

(10) Patent No.: US 8,478,870 B2
(45) Date of Patent: Jul. 2, 2013

(54) TERMINAL APPARATUS, RELAY APPARATUS, PROCESSING METHOD, RECORDING MEDIUM, AND DATA SIGNAL

(75) Inventor: Hidetomo Nakayama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 183 days.

(21) Appl. No.: 12/547,248

(22) Filed: Aug. 25, 2009

(65) Prior Publication Data

US 2010/0174827 A1 Jul. 8, 2010

(30) Foreign Application Priority Data

Jan. 6, 2009 (JP) .................................. 2009-000883

(51) Int. Cl.
*G06F 15/173* (2006.01)

(52) U.S. Cl.
USPC ........................... 709/225; 709/239; 358/1.15

(58) Field of Classification Search
USPC ........................... 709/225, 249, 239; 358/1.15
See application file for complete search history.

(56) References Cited

U.S. PATENT DOCUMENTS

| | | | | |
|---|---|---|---|---|
| 7,694,015 | B2* | 4/2010 | Yoshiuchi et al. | 709/244 |
| 7,835,341 | B2* | 11/2010 | Inujima et al. | 370/349 |
| 2002/0010799 | A1 | 1/2002 | Kubota et al. | |
| 2002/0113995 | A1* | 8/2002 | Evans et al. | 358/1.15 |
| 2006/0212932 | A1* | 9/2006 | Patrick et al. | 726/11 |
| 2006/0268842 | A1* | 11/2006 | Takahashi et al. | 370/352 |
| 2007/0097989 | A1 | 5/2007 | Sato | |
| 2007/0118567 | A1* | 5/2007 | Isokawa | 707/200 |
| 2007/0255784 | A1* | 11/2007 | Takechi et al. | 709/203 |
| 2008/0056238 | A1 | 3/2008 | Inujima et al. | |
| 2008/0186977 | A1* | 8/2008 | Nomi | 370/395.5 |

FOREIGN PATENT DOCUMENTS

| | | |
|---|---|---|
| CN | 1905495 A | 1/2007 |
| JP | 2001-352337 A | 12/2001 |
| JP | 2003-244243 A | 8/2003 |
| JP | 2003-271346 A | 9/2003 |
| JP | 2006-005738 A | 1/2006 |
| JP | 2008-077558 A | 4/2008 |

OTHER PUBLICATIONS

Japanese Office Action dated Dec. 18, 2012 for corresponding Japanese Application No. 2009-000883.
Ryotaro Oda, et al. "An Autonomous Clustering-Based Hierarchical Routing Using Decentralized Route Information Management Scheme for Mobile Ad Hoc Networks.", Research Report of the Institute of Electronics, Information and Communication Engineers (IEICE), Aug. 16, 2007, vol. 107, No. 193.
Chinese Office Action issued on Mar. 25, 2013 in corresponding Chinese Application No. 200910175840.0.

\* cited by examiner

*Primary Examiner* — Emmanuel L Moise
*Assistant Examiner* — Marie Georges Henry
(74) *Attorney, Agent, or Firm* — Sughrue Mion, PLLC

(57) ABSTRACT

A terminal apparatus that comprises a request obtaining unit that obtains a processing request made to a processing execution apparatus, a generating unit that generates a relay-use processing request containing the processing request obtained by the request obtaining unit and address information of the processing execution apparatus, an address obtaining unit that obtains address information indicating a relay apparatus connected to each of a first communication path and a second communication path, the processing execution apparatus being connected to the first communication path, the terminal apparatus being connected to the second communication path, the first communication path being not access directly to the terminal apparatus, and a transmitting unit that transmits the relay-use processing request generated by the generating unit to the relay apparatus indicated by the address information obtained by the address obtaining unit.

10 Claims, 3 Drawing Sheets

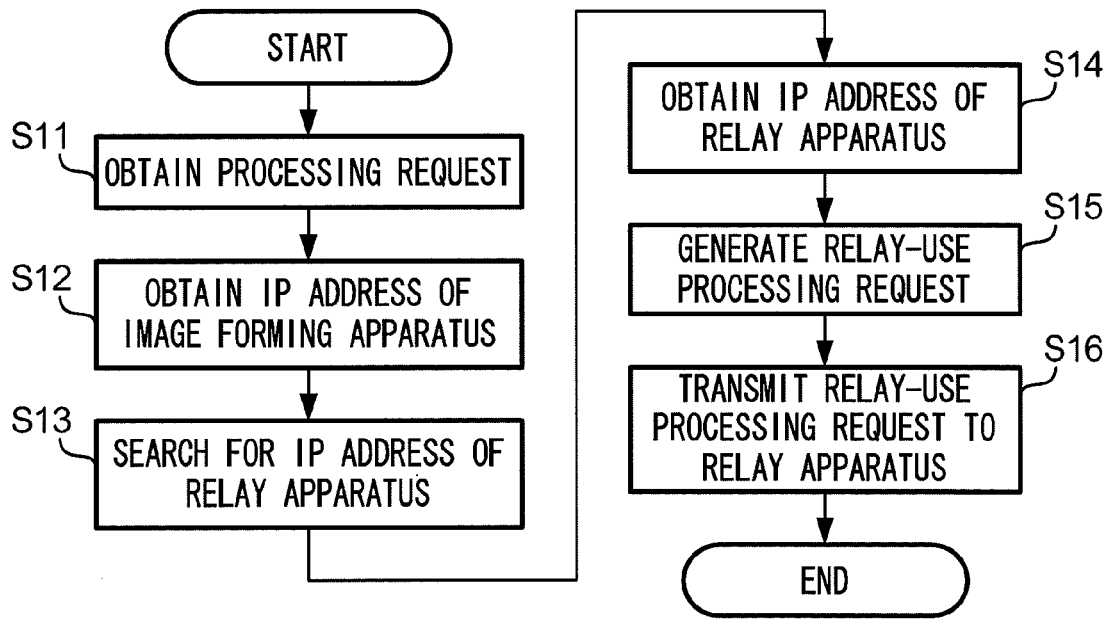
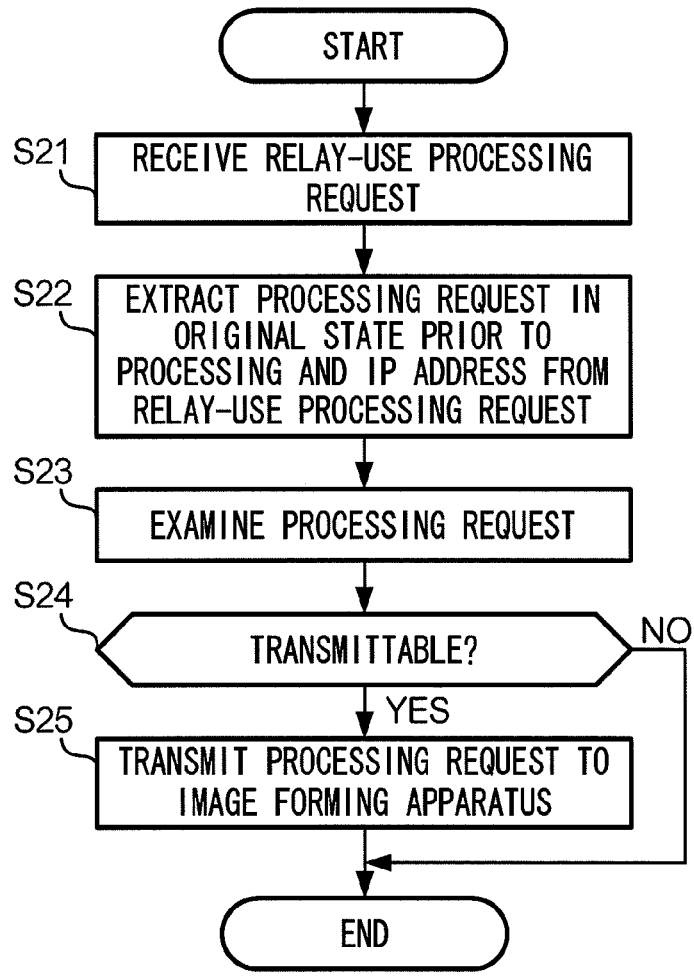

TERMINAL APPARATUS, RELAY APPARATUS, PROCESSING METHOD, RECORDING MEDIUM, AND DATA SIGNAL

CROSS-REFERENCE TO RELATED APPLICATIONS

This application is based on and claims priority under 35 USC 119 from Japanese Patent Application No. 2009-000883 filed Jan. 6, 2009.

BACKGROUND

1. Technical Field

The present invention relates to a terminal apparatus, a relay apparatus, and a recording medium.

2. Related Art

There is a technique that determines the status of a terminal apparatus connected to a network and switches the network to which the terminal apparatus is to be connected to either a normal network (called a "backbone network" hereinafter) or a network that is isolated from the backbone network (called an "isolated network" hereinafter) based on the result of that determination. A system in which this technique is used shall be called a "network quarantine system" here.

SUMMARY

A terminal apparatus according to an aspect of the present invention includes a request obtaining unit that obtains a processing request made to a processing execution apparatus; a generating unit that generates a relay-use processing request containing the processing request obtained by the request obtaining unit and address information of the processing execution apparatus; an address obtaining unit that obtains address information indicating a relay apparatus connected to each of a first communication path and a second communication path, the processing execution apparatus being connected to the first communication path, the terminal apparatus being connected to the second communication path, the first communication path being not access directly to the terminal apparatus; and a transmitting unit that transmits the relay-use processing request generated by the generating unit to the relay apparatus indicated by the address information obtained by the address obtaining unit.

BRIEF DESCRIPTION OF THE DRAWINGS

An exemplary embodiment of the present invention shall be described in detail based on the following figures, wherein:

FIG. 6 is a flowchart illustrating processing executed by a terminal apparatus; and FIG. 7 is a flowchart illustrating processing executed by a relay apparatus.

DETAILED DESCRIPTION

1. Exemplary Embodiment

Figure 1:
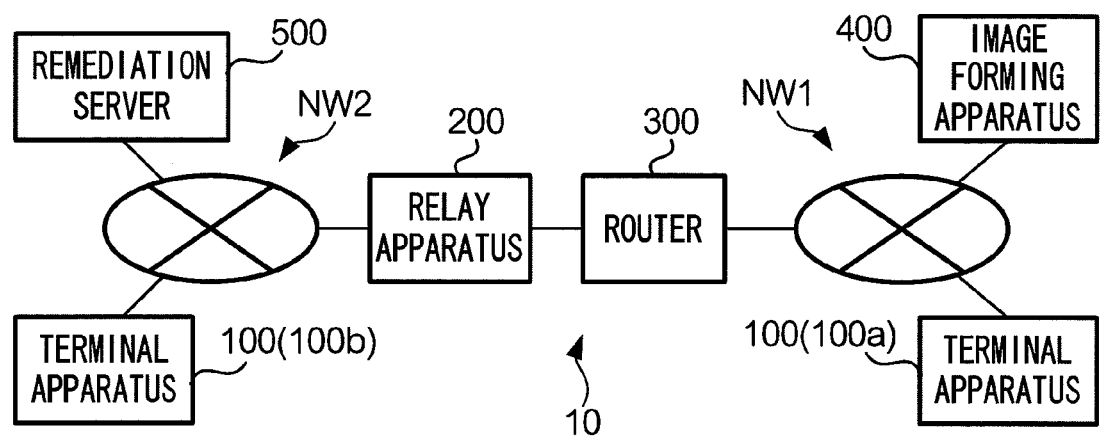
FIG. 1 is a diagram illustrating an outline of the structure of a network quarantine system.

FIG. 1 is a diagram illustrating an outline of the structure of a network quarantine system embodying the present invention. A network quarantine system 10 is a system deployed in, for example, a LAN (Local Area Network) within an office or the like. The network quarantine system 10 includes a backbone network NW1 and an isolated network NW2 as its networks. The backbone network NW1 is an example of a "first communication path" according to the present invention, and the isolated network NW2 is an example of a "second communication path" according to the present invention. The backbone network NW1 is a network to which terminal apparatuses that meet certain predetermined conditions are connected, whereas the isolated network NW2 is a network to which terminal apparatuses that do not meet those certain predetermined conditions are connected. Note that the "terminal apparatus" is not limited to a terminal apparatus 100 shown in the drawings, and multiple terminal apparatuses may be present. Hereinafter, "quarantine" refers to determining whether or not these terminal apparatuses meet the certain predetermined conditions and taking measures based on the result of the determination. Furthermore, the conditions used for this quarantine shall be called "quarantine conditions" hereinafter.

In the present exemplary embodiment, the quarantine conditions are determined based on, for example, the security policy of the system. The level to which update programs (also known as "patches") have been applied to the terminal apparatus, information regarding the version of the operating system, application programs, or the like, whether or not virus scans have been executed, information regarding the version of the definition file that defines viruses, and so on can be employed as quarantine conditions. The determination is carried out so that, for example, if the latest patches have been applied to a certain terminal apparatus, that terminal apparatus is connected to the backbone network NW1, whereas if the latest patches have not been applied to another certain terminal apparatus, that terminal apparatus is connected to the isolated network NW2.

Note that the backbone network NW1 and the isolated network NW2 need not be physically different networks; distinguishing the networks logically is sufficient. For example, the backbone network NW1 and the isolated network NW2 can be distinguished by assigning different IP (Internet Protocol) address ranges to the backbone network NW1 and the isolated network NW2. In the present exemplary embodiment, the IP addresses assigned within the backbone network NW1 are "129.249.100.x", and the IP addresses assigned within the isolated network NW2 are "192.168.10.x" (where x is an integer from 0 to 255). Note that the separate IP addresses mentioned above are simply examples used for explanatory purposes, and thus the IP addresses actually used are not limited to these examples. IP addresses are an example of "address information" according to the present invention, and are information for uniquely identifying communication devices located on a network.

A terminal apparatus connected to the isolated network NW2 is rendered unable to access the backbone network NW1 in its present state. To be more specific, the IP address and default gateway address normally assigned by the DHCP (Dynamic Host Configuration Protocol) server of the backbone network NW1 are not assigned to the terminal apparatus connected to the isolated network NW2. Instead, a private address different from the normal subnet address is assigned. Therefore, the terminal apparatus connected to the isolated network NW2 is rendered unable to access directly via the router, and thus cannot logically access the backbone network NW1 even if a physical connection similar to the connection made when the terminal apparatus normally connects to the backbone network NW1 is established. Here, the default gateway address is information for identifying the communication path within the backbone network NW1, and is an example of "path information" according to the present invention.

The backbone network NW1 includes a router 300, and an image forming apparatus 400 is furthermore connected to the backbone network NW1. The router 300 functions as the default gateway of the backbone network NW1, and is a communication device that controls the transfer of data in the backbone network NW1. Note that the router 300 may be connected to another network aside from the backbone network NW1 and the isolated network NW2 (such as the Internet, for example). The image forming apparatus 400 is what is known as a network printer, receiving processing requests from terminal apparatuses connected to the backbone network NW1 or the isolated network NW2 and forming images based on the received processing requests. Various methods can be employed as the image recording methods used by the image forming apparatus 400, including the electrophotographic method, the dot impact method, and so on.

The present exemplary embodiment assumes that the IP address assigned to the router 300 is "129.249.100.240", while the IP address assigned to the image forming apparatus 400 is "129.249.100.10". Furthermore, the IP addresses assigned to the router 300 and the image forming apparatus 400 are assumed to be static IP addresses in the present exemplary embodiment.

A remediation server 500 is connected to the isolated network NW2. The remediation server 500 stores data (patches and so on) necessary for terminal apparatuses that do not meet the quarantine conditions (connected to the isolated network NW2) to become compliant with the quarantine conditions. Note that the remediation server 500 may provide an interactive interface to terminal apparatuses, supplying data in response to operations performed by the user of a terminal apparatus. The network to which is connected a terminal apparatus that has taken the necessary measures using the remediation server 500 is switched from the isolated network NW2 to the backbone network NW1.

The terminal apparatus 100 is a terminal apparatus connected to the backbone network NW1 or the isolated network NW2. The terminal apparatus 100 may be, for example, a portable laptop computer, or may be another type of terminal apparatus, such as a desktop computer. In addition, the terminal apparatus 100 may establish its network connection over wires or wirelessly. Note that in the present exemplary embodiment, when it is necessary to distinguish between network connection states of terminal apparatuses 100, a terminal apparatus 100 connected to the backbone network NW1 is referred to as a "terminal apparatus 100a", whereas a terminal apparatus 100 connected to the isolated network NW2 is referred to as a "terminal apparatus 100b".

Figure 2:
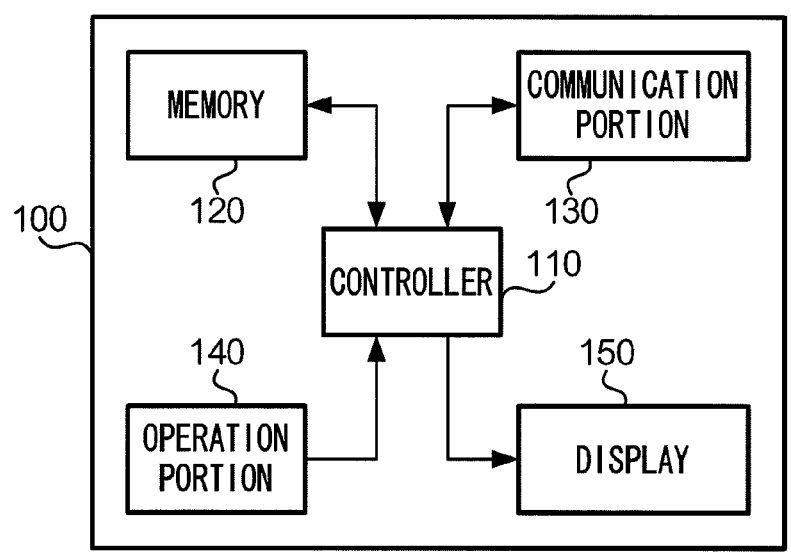
FIG. 2 is a block diagram illustrating the configuration of a terminal apparatus.

FIG. 2 is a block diagram illustrating the configuration of the terminal apparatus 100. As shown in FIG. 2, the terminal apparatus 100 includes a controller 110, a memory 120, a communication portion 130, an operation portion 140, and a display 150. The controller 110 includes a control unit such as a CPU (Central Processing Unit), a memory, and the like, and controls the operation of the terminal apparatus 100 by executing stored programs. The memory 120 is a storage unit that stores data necessary for the controller 110 to operate. The communication portion 130 is a communication interface that connects to the backbone network NW1 or the isolated network NW2, and mediates the exchange of data. The operation portion 140 accepts operations made by a user using a keyboard, a mouse, or the like, and supplies operation information expressing the operations performed by the user to the controller 110. The display 150 includes a display device such as a liquid-crystal monitor, and displays images prompting the user to perform operations.

The controller 110 of the present exemplary embodiment implements an operating system (referred to as an "OS" hereinafter), a word processing application, and a printer driver by executing programs. The OS realizes the basic functions of the terminal apparatus 100, such as determining the state of network connections, the exchange of data, and so on. The word processing application realizes functions for creating document data including text, images, and so on. The printer driver realizes functions for generating and managing processing requests based on document data created using the word processing application. The management function of the printer driver includes mode switching based on the connection status of the terminal apparatus 100.

In the present exemplary embodiment, "processing request" refers to a request made to the image forming apparatus 400 for processing (processing for forming an image). Note that in the present exemplary embodiment, the image forming apparatus 400 is an example of a "processing execution apparatus" according to the present invention. However, the processing execution apparatus according to the present invention is not limited to an image forming apparatus.

Figure 3:
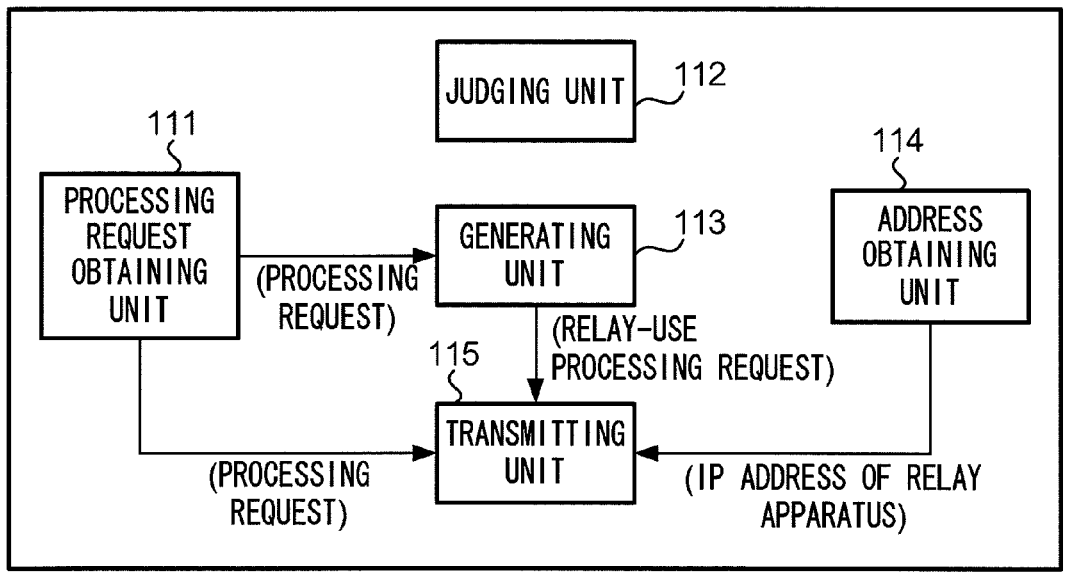
FIG. 3 is a function block diagram illustrating functions implemented by a terminal apparatus.

FIG. 3 is a function block diagram illustrating functions implemented by the controller 110. As can be seen in FIG. 3, the controller 110 of the terminal apparatus 100 implements a processing request obtaining unit 111, a judging unit 112, a generating unit 113, an address obtaining unit 114, and a transmitting unit 115 by executing programs. The processing request obtaining unit 111 has a function for obtaining a processing request. The "obtaining" mentioned here may include cases where the terminal apparatus 100 itself generates and obtains a processing request, as well as cases where a processing request generated by an external apparatus is obtained. The judging unit 112 has a function for judging the network connection status of the terminal apparatus 100. In other words, the judging unit 112 judges whether the terminal apparatus 100 is connected to the backbone network NW1 or to the isolated network NW2. This judgment is carried out by the judging unit 112 comparing the status of its own terminal apparatus to the quarantine conditions.

Note that the controller 110 changes how the terminal apparatus 100 operates based on the result of the judgment performed by the judging unit 112. To rephrase, the controller 110 causes the terminal apparatus 100 to operate in an operational mode according to the result of the judgment performed by the judging unit 112. In the following descriptions, the operational mode used when the terminal apparatus 100 is connected to the backbone network NW1 shall be called a "normal mode", whereas the operational mode when the terminal apparatus 100 is connected to the isolated network NW2 shall be called an "isolation mode".

The generating unit 113 and address obtaining unit 114 function when the terminal apparatus 100 is operating in the isolation mode. The generating unit 113 processes a processing request obtained by the processing request obtaining unit 111, thereby generating a new processing request. The processing request generated by the generating unit 113 shall be called a "relay-use processing request" hereinafter. The address obtaining unit 114 obtains the IP address of a relay apparatus 200 when the terminal apparatus 100 is operating in the isolation mode. Note that the IP address of the relay apparatus 200 is detected from the isolated network NW2. The transmitting unit 115 has a function for transmitting processing requests. When the terminal apparatus 100 is operating in the normal mode, the transmitting unit 115 transmits processing requests obtained by the processing request obtaining unit 111 to the image forming apparatus 400, but when the terminal apparatus 100 is operating in the isolation mode, the transmitting unit 115 transmits the relay-use processing request generated by the generating unit 113 to the IP address obtained by the address obtaining unit 114, or in other words, to the relay apparatus 200. Note that the IP address of the image forming apparatus 400 is stored in a memory or the like in advance.

The relay apparatus 200 is connected to both the backbone network NW1 and the isolated network NW2. In other words, the relay apparatus 200 includes a connection unit that connects to the backbone network NW1 and a connection unit that connects to the isolated network NW2. The relay apparatus 200 is a communication device that relays the processing request transmitted by the terminal apparatus connected to the isolated network NW2, or in other words, the relay-use processing request, and transmits that relay-use processing request to the image forming apparatus 400. The relay apparatus 200 processes processing requests so that the processing requests can be exchanged between different networks.

Figure 4:
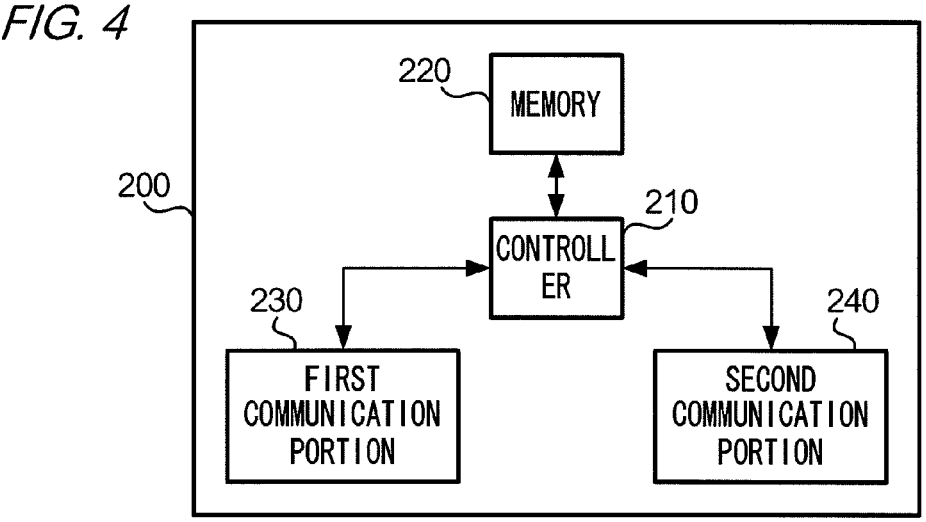
FIG. 4 is a block diagram illustrating the configuration of a relay apparatus.

FIG. 4 is a block diagram illustrating the configuration of the relay apparatus 200. As shown in FIG. 4, the relay apparatus 200 includes a controller 210, a memory 220, a first communication portion 230, and a second communication portion 240. The controller 210 includes a control unit such as a CPU, a memory, and the like, and controls the operation of the relay apparatus 200 by executing stored programs. The memory 220 is a storage unit that stores data necessary for the controller 210 to operate. The first communication portion 230 is a communication interface that connects to the backbone network NW1, and the second communication portion 240 is a communication interface that connects to the isolated network NW2. The first communication portion 230 is an example of a "first connection unit" according to the present invention, and the second communication portion 240 is an example of a "second connection unit" according to the present invention.

The relay apparatus 200 is assigned an IP address on the backbone network NW1 and an IP address on the isolated network NW2. To rephrase, the relay apparatus 200 has an IP address assigned to the first communication portion 230 and an IP address assigned to the second communication portion 240. In the present exemplary embodiment, the IP address "129.249.100.240" is assigned to the relay apparatus 200 on the backbone network NW1, whereas the IP address "192.168.10.20" is assigned to the relay apparatus 200 on the isolated network NW2.

Figure 5:
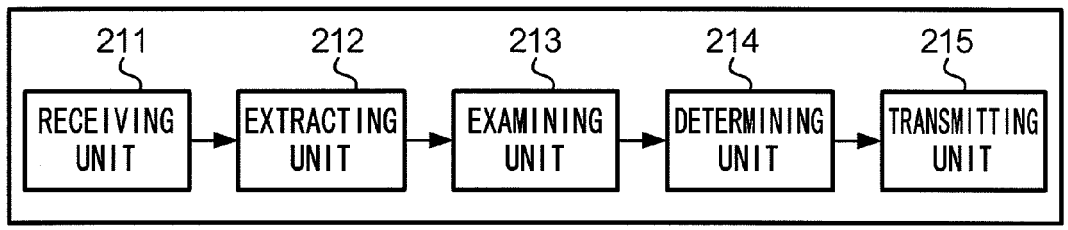
FIG. 5 is a function block diagram illustrating functions implemented by a relay apparatus.

FIG. 5 is a function block diagram illustrating functions implemented by the controller 210. As can be seen in FIG. 5, the controller 210 of the relay apparatus 200 implements a receiving unit 211, an extracting unit 212, an examining unit 213, a determining unit 214, and a transmitting unit 215. The receiving unit 211 has a function for receiving processing requests. The receiving unit 211 receives processing requests transmitted by the terminal apparatus 100b via the relay apparatus 200 (that is, relay-use processing requests). The extracting unit 212 has a function for extracting the processing requests, in the state those requests were originally in prior to the processing performed by the generating unit 113, from the relay-use processing request. The examining unit 213 has a function for examining whether or not it is acceptable to transmit a processing request to the image forming apparatus 400. The examining unit 213 examines the processing request by, for example, executing a virus scan through a known method. The examination performed by the examining unit 213 may involve a determination as to whether the processing request transmitted from the isolated network NW2 has the same level of safety as a processing request transmitted from the backbone network NW1. The determining unit 214 has a function for determining, based on the result of the examination performed by the examining unit 213, whether or not it is acceptable to transmit a processing request to the image forming apparatus 400. The determining unit 214 performs control so that the processing request is passed to the transmitting unit 215 when the result of the examination indicates that the transmission is acceptable, and so that the processing request is not transmitted when the result of the examination indicates that the transmission is not acceptable. The transmitting unit 215 has a function for transmitting processing requests transmitted from the isolated network NW2 and extracted by the extracting unit 212 to the image forming apparatus 400.

The configuration of the network quarantine system 10 of the present exemplary embodiment is as described thus far. Under this configuration, the user of a terminal apparatus 100 physically connects the terminal apparatus 100 and joins a network. The network is joined using a known login process. Upon joining the network, the terminal apparatus 100 determines whether it itself meets the quarantine conditions, and alters its operations thereafter based on the result of that determination.

When the terminal apparatus 100 itself meets the quarantine conditions, it is connected to the backbone network NW1 and operates as a terminal apparatus 100a. The terminal apparatus 100a need not be particularly restricted to data exchange within the backbone network NW1. In other words, the operations of the terminal apparatus 100a are the same as those of a terminal apparatus connected to a normal network. However, when the terminal apparatus 100 itself does not meet the quarantine conditions, it is connected to the isolated network NW2 and operates as a terminal apparatus 100b. The terminal apparatus 100b is restricted to data exchange with the backbone network NW1. In the present exemplary embodiment, the terminal apparatus 100b is only permitted to transmit processing requests via the relay apparatus 200, and is not permitted to carry out any other forms of data exchange.

FIG. 6 is a flowchart illustrating processing executed by the terminal apparatus 100b, or in other words, by a terminal apparatus 100 connected to the isolated network NW2. As shown in FIG. 6, the controller 110 of the terminal apparatus 100b first obtains a processing request (step S11). Next, the controller 110 obtains the IP address of the image forming apparatus 400 from its memory (step S12), and furthermore searches for and obtains the IP address of the relay apparatus 200 (steps S13 and S14). The controller 110 searches for the IP address of the relay apparatus 200 through broadcasting.

Upon obtaining the processing request and the IP address of the image forming apparatus 400, the controller 110 uses that processing request and IP address to generate a relay-use processing request (step S15). Here, the "relay-use processing request" refers to data that has been processed as a consolidation of the processing request and the IP address of the image forming apparatus 400, so that those two pieces of information appear as a single processing request. However, the relay-use processing request is processed according to a predetermined rule, and is structured so that the processing request in its original state, prior to processing, and the IP address can be extracted by the relay apparatus 200. Once the relay-use processing request has been generated, the controller 110 transmits that relay-use processing request to the IP address obtained in step S14, or in other words, to the relay apparatus 200 (step S16).

FIG. 7 is a flowchart illustrating processing executed by the relay apparatus 200 when a relay-use processing request has been transmitted by the terminal apparatus 100*b*. As shown in FIG. 7, the controller 210 of the relay apparatus 200 first receives the relay-use processing request via the isolated network NW2 (step S21). The controller 210 then extracts the processing request, in its original state prior to the processing, and the IP address from the received relay-use processing request (step S22). Next, the controller 210 examines the processing request extracted in step S22 (step S23), and determines whether or not it is acceptable to transmit that processing request (step S24). The determination performed in step S24 may employ various other conditions based on the quarantine conditions in addition to the result of the examination performed in step S23. If the processing request has been determined to be acceptable (YES in step S24), the controller 210 transmits the processing request to the IP address extracted in step S22, or in other words, to the image forming apparatus 400 (step S25). However, if the processing request has been determined to be unacceptable (NO in step S24), the controller 210 ends the present processing without transmitting the processing request to the image forming apparatus 400.

As described thus far, in the network quarantine system 10 of the present exemplary embodiment, there are cases where processes requested to be executed by a processing execution apparatus (the image forming apparatus 400) connected to the backbone network NW1 are to be executed even when the request was made by a terminal apparatus 100*b*, which is connected to an isolated network NW2 logically isolated from the backbone network NW1. These cases may be determined based on the security policy and so on of the system, but also include a case where, for example, the process requested from the isolated network NW2 clearly will not modify the resources (data, files, and so on) of devices located on the backbone network NW1.

The network quarantine system 10 of the present exemplary embodiment creates a state in which certain processes requested of a device on the backbone network NW1 from a device on the isolated network NW2 are permitted. Therefore, even if a terminal apparatus temporarily does not meet the quarantine conditions, such as, for example, immediately following the release of the latest patches, the execution of the stated certain processes is not blocked, whereas the execution of other process that may have effects on the backbone network NW1 is blocked.

2. Variations

The above embodiment is one example of the present invention. However, the present invention can be carried out even when, for example, the following variations are applied thereto. Note that the above embodiment and the following variations may be applied in combination as necessary.

2.1 Variation 1

The above embodiment assumes that no processing requests not intended by the user will occur. However, due to computer viruses and the like, there are of course cases where processing requests not intended by the user do occur. In response to the occurrence of such processing requests not intended by the user, the present invention may employ a configuration in which a notification prompting the user to confirm the processing request is provided to the user when the relay-use processing request is transmitted. This makes the user aware of the transmission of the processing request in advance. Furthermore, this configuration may be implemented so that the relay-use processing request is not sent unless acknowledged by the user through some sort of operation.

2.2 Variation 2

It is desirable for the relay apparatus of the present invention to use a port having a number different from that of a so-called "well-known" port (a well-known, common port number). This is because using well-known ports increases the likelihood of an attack by a malicious computer virus or the like. Therefore it is desirable for the relay apparatus of the present invention to use a unique port number different from those used by, for example, the LPR (Line Printer Remote) protocol.

2.3 Variation 3

The criteria used in the determination process performed in step S24 may be changed dynamically. Thus the present invention may employ a configuration in which, for example, a server device storing policy information that defines the determination criteria (a policy server) is provided on the backbone network NW1, and the relay apparatus obtains the policy information from the policy server and uses that information to determine whether or not it is acceptable to transmit a processing request. In this case, the configuration is such that the policy information in the policy server is updated as necessary by a network administrator or the like.

2.4 Variation 4

The determination as to whether or not a terminal apparatus meets the quarantine conditions may be performed by an external apparatus. In this case, the operational mode of the terminal apparatus may be changed depending on which of the backbone network NW1 and the isolated network NW2 the terminal apparatus itself is connected to (in other words, which network's IP address is assigned to the terminal apparatus).

2.5 Variation 5

The various functions indicated in FIG. 3 or FIG. 5 may be implemented by a single program, or may be implemented by a combination of multiple programs. These various functions may also be implemented by multiple control units operating cooperatively.

Furthermore, the program according to the present invention may be supplied having been stored, entirely or in part, in a recording medium such as an optical disk, a flash memory, or the like, or may be downloaded via a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:

a terminal apparatus; and a relay apparatus,
wherein the terminal apparatus comprises:
  a first controller comprising a first central processing unit;
  a request obtaining unit that obtains, using the first central processing unit, a request for forming an image to be made to a processing execution apparatus that forms images;
  a generating unit that generates, using the first central processing unit, a relay-use processing request containing the request for forming the image obtained by the request obtaining unit and address information of the processing execution apparatus, the address information of the processing execution apparatus obtained from a memory;
  an address obtaining unit that obtains, using the first central processing unit, address information indicating the relay apparatus connected to each of a first communication path and a second communication path, the processing execution apparatus being connected to the first communication path, the terminal apparatus being connected to the second communication path;
  a transmitting unit that transmits, using the first central processing unit, the relay-use processing request generated by the generating unit to the relay apparatus indicated by the address information obtained by the address obtaining unit or transmits the request for forming the image obtained by the request obtaining unit to the processing execution apparatus connected to the first communication path; and
  a judging unit that judges, using the first central processing unit, whether the terminal apparatus can be directly connected to the first communication path based on a first predetermined condition, the first predetermined condition comprising one or more of a level to which update patches have been applied to the terminal apparatus, a version of an operating system, and information regarding a version of a virus definition file,
  wherein in a case that the terminal apparatus is judged by the judging unit as not meeting the first predetermined condition, the transmitting unit transmits the relay-use processing request generated by the generating unit to the relay apparatus indicated by the address information obtained by the address obtaining unit, and in a case that the terminal apparatus is judged by the judging unit as meeting the first predetermined condition, the transmitting unit transmits the request for forming the image obtained by the request obtaining unit to the processing execution apparatus connected to the first communication path;
wherein the relay apparatus comprises:
  a second controller comprising a second central processing unit;
  a first connection unit that connects, using the second central processing unit, to the first communication path to which the processing execution apparatus is connected;
  a second connection unit that connects, using the second central processing unit, to the second communication path to which the terminal apparatus is connected, the second communication path being logically isolated from the first communication path;
  a receiving unit that receives, using the second central processing unit, the relay-use processing request containing the request for forming the image from the terminal apparatus via the second communication path;
  a determining unit that determines, using the second central processing unit, whether or not the received relay-use processing request containing the request for forming the image meets a second predetermined condition even if the terminal apparatus is judged as not meeting the first predetermined condition; and
  a transmitting unit that transmits, using the second central processing unit, the relay-use processing request containing the request for forming the image that is determined by the determining unit as meeting the second predetermined condition to the processing execution apparatus via the first communication path.

2. The system of claim 1, wherein the terminal apparatus further comprises:
  a connection unit that connects to the first or second communication path,
  wherein in the case where the terminal apparatus is judged as not meeting the first predetermined condition, the connection unit is connected to the second communication path, and in the case where the terminal apparatus is judged as meeting the first predetermined condition, the connection unit is connected to the first communication path.

3. The system of claim 1, wherein the relay apparatus further comprises:
  an extracting unit that extracts address information indicating the processing execution apparatus from the relay-use processing request received by the receiving unit,
  wherein the transmitting unit transmits the relay-use processing request that is determined by the determining unit as meeting the second predetermined condition to the processing execution apparatus indicated by the address information extracted by the extracting unit.

4. The system of claim 1, wherein a first network address is assigned to the first connection unit, and a second network address, different from the first network address, is assigned to the second connection unit.

5. The system of claim 1, wherein the system is a network quarantine system, the terminal apparatus is a computer comprising a print driver associated with the processing execution apparatus, the processing execution apparatus is connected to a first network via the first communication path and the terminal apparatus is connected to a second network via the second communication path, wherein the first network is different from the second network, and
  requests for forming images are sent from (i) the second network to which the terminal apparatus is connected to (ii) the first network to which the processing execution apparatus is connected.

6. A method for a system including a terminal apparatus and a relay apparatus, the method comprising:
  a requesting process performed by the terminal apparatus; and
  a relay process performed by the relay apparatus,
  wherein the requesting process comprises:
    obtaining, using a first controller comprising a first central processing unit included in the terminal apparatus, a request for forming an image to be made to a processing execution apparatus that forms images;
    generating a relay-use processing request containing the obtained request for forming the image and address information of the processing execution apparatus;
    obtaining address information indicating the relay apparatus connected to each of a first communication path and a second communication path, the processing execution apparatus being connected to the first communication path, the terminal apparatus being connected to the second communication path;

transmitting the generated relay-use processing request to the relay apparatus indicated by the obtained address information or transmitting the obtained request for forming the image to the processing execution apparatus connected to the first communication path; and judging, by the terminal apparatus, whether the terminal apparatus can be directly connected to the first communication path based on a first predetermined condition, the first predetermined condition comprising one or more of a level to which update patches have been applied to the terminal apparatus, a version of an operating system, and information regarding a version of a virus definition file, wherein in a case that the terminal apparatus is judged by the judging as not meeting the first predetermined condition, the transmitting comprises transmitting the generated relay-use processing request to the relay apparatus indicated by the obtained address information, and in a case that the terminal apparatus is judged by the judging as meeting the first predetermined condition, the transmitting comprises transmitting the obtained request for forming the image to the processing execution apparatus connected to the first communication path, wherein the relay process comprises:

connecting, by a second controller comprising a second central processing unit included in the relay apparatus, the relay apparatus to the first communication path to which the processing execution apparatus is connected;

connecting, by the second central processing unit, the relay apparatus to the second communication path to which the terminal apparatus is connected, the second communication path being logically isolated from the first communication path;

receiving the relay-use processing request containing the request for forming the image from the terminal apparatus via the second communication path;

determining whether or not the received relay-use processing request containing the request for forming the image meets a second predetermined condition even if the terminal apparatus is judged as not meeting the first predetermined condition; and transmitting the relay-use processing request containing the request for forming the image that is determined as meeting the second predetermined condition to the processing execution apparatus via the first communication path.

7. The method of claim 6, wherein the connecting to the first communication path comprises connecting a first connection unit of the relay apparatus to the first communication path, and the connecting to the second communication path comprises connecting a second connection unit of the relay apparatus to the second communication path, wherein a first network address is assigned to the first connection unit, and a second network address, different from the first network address, is assigned to the second connection unit.

8. The method of claim 6, wherein the system is a network quarantine system, the terminal apparatus is a computer comprising a print driver associated with the processing execution apparatus, the processing execution apparatus is connected to a first network via the first communication path and the terminal apparatus is connected to a second network via the second communication path, wherein the first network is different from the second network, and the method comprises:

sending requests for forming images from (i) the second network to which the terminal apparatus is connected to (ii) the first network to which the processing execution apparatus is connected.

9. A non-transitory computer-readable recording medium storing a program causing a system including a terminal apparatus and a relay apparatus to execute a process, the process comprising:

a requesting process performed by the terminal apparatus; and a relay process performed by the relay apparatus, wherein the requesting process comprises:

obtaining a request for forming an image to be made to a processing execution apparatus that forms images;

generating a relay-use processing request containing the obtained request for forming the image and address information of the processing execution apparatus;

obtaining address information indicating the relay apparatus connected to each of a first communication path and a second communication path, the processing execution apparatus being connected to the first communication path, the terminal apparatus being connected to the second communication path;

transmitting the generated relay-use processing request to the relay apparatus indicated by the obtained address information or transmitting the obtained request for forming the image to the processing execution apparatus connected to the first communication path; and judging, by the terminal apparatus, whether the terminal apparatus can be directly connected to the first communication path based on a first predetermined condition, the first predetermined condition comprising one or more of a level to which update patches have been applied to the terminal apparatus, a version of an operating system, and information regarding a version of a virus definition file, wherein in a case that the terminal apparatus is judged by the judging as not meeting the first predetermined condition, the transmitting comprises transmitting the generated relay-use processing request to the relay apparatus indicated by the obtained address information, and in a case that the terminal apparatus is judged by the judging as meeting the first predetermined condition, the transmitting comprises transmitting the obtained request for forming the image to the processing execution apparatus connected to the first communication path, wherein the relay process comprises:

connecting the relay apparatus to the first communication path to which the processing execution apparatus is connected;

connecting the relay apparatus to the second communication path to which the terminal apparatus is connected, the second communication path being logically isolated from the first communication path;

receiving the relay-use processing request containing the request for forming the image from the terminal apparatus via the second communication path;

determining whether or not the received relay-use processing request containing the request for forming the image meets a second predetermined condition even if the terminal apparatus is judged as not meeting the first predetermined condition; and transmitting the relay-use processing request containing the request for forming the image that is determined as meeting the second predetermined condition to the processing execution apparatus via the first communication path.

10. The non-transitory computer-readable recording medium of claim 9, wherein the system is a network quarantine system, the terminal apparatus is a computer comprising a print driver associated with the processing execution apparatus, the processing execution apparatus is connected to a first network via the first communication path and the terminal apparatus is connected to a second network via the second communication path, wherein the first network is different from the second network, and the process comprises:

sending requests for forming images from (i) the second network to which the terminal apparatus is connected to (ii) the first network to which the processing execution apparatus is connected.

\* \* \* \* \*